United States Patent
Johnston et al.

(10) Patent No.: US 8,567,526 B2
(45) Date of Patent: Oct. 29, 2013

(54) WELLBORE STEERING BASED ON ROCK STRESS DIRECTION

(75) Inventors: Lucian Johnston, Sugar Land, TX (US); Selim Djandji, Sugar Land, TX (US); Andy Hawthorn, Missouri City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 413 days.

(21) Appl. No.: 12/633,061

(22) Filed: Dec. 8, 2009

(65) Prior Publication Data

US 2011/0132663 A1   Jun. 9, 2011

(51) Int. Cl.
*E21B 7/04* (2006.01)

(52) U.S. Cl.
USPC .................... 175/61; 175/73; 175/24

(58) Field of Classification Search
USPC .............. 175/61, 24, 73, 50; 367/14–86, 911, 367/912
See application file for complete search history.

(56) References Cited

U.S. PATENT DOCUMENTS

| | | | |
|---|---|---|---|
| 4,621,691 A * | 11/1986 | Schuh | 166/268 |
| 4,899,320 A | 2/1990 | Hearn et al. | |
| 5,064,006 A * | 11/1991 | Waters et al. | 175/45 |
| 6,084,826 A | 7/2000 | Leggett, III | |
| 6,584,837 B2 | 7/2003 | Kurkoski | |
| 7,093,672 B2 | 8/2006 | Seydoux et al. | |
| 7,269,515 B2 | 9/2007 | Tabarovsky et al. | |
| 7,272,504 B2 | 9/2007 | Akimov et al. | |
| 2005/0211468 A1 * | 9/2005 | Veeningen et al. | 175/24 |
| 2009/0266548 A1 | 10/2009 | Olsen et al. | |

FOREIGN PATENT DOCUMENTS

WO    01/94982 A2    12/2001
WO    2009/021010 A2    2/2009

* cited by examiner

*Primary Examiner* — Yong-Suk (Philip) Ro
(74) *Attorney, Agent, or Firm* — Colin Wier; Rodney Warfford

(57) ABSTRACT

A method of steering a drilling operation of a well using rock stress measurements. The method includes obtaining well data from at least one logging while drilling tool in the well, where the well data includes stress direction information, generating, using a central processing unit (CPU), a well trajectory using survey data from the well, where the well trajectory includes a borehole direction, determining, using the CPU, a direction of minimum horizontal stress using the well data, and comparing, using the CPU, the direction of minimum horizontal stress to the borehole direction to determine that a directional criteria is not satisfied. The method further includes in response to determining that the directional criteria is not satisfied, generating an updated well trajectory that satisfies the directional criteria and adjusting the drilling operation using the updated well trajectory.

18 Claims, 4 Drawing Sheets

ABLE STEERING BASED ON ROCK
STRESS DIRECTION

BACKGROUND

Operations, such as surveying, drilling, wireline testing, completions, production, planning and field analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine if the formations have characteristics suitable for storing fluids.

During drilling and production operations, data is typically collected for analysis and/or monitoring of the operations. Such data may include, for instance, information regarding subterranean formations, equipment, and historical and/or other data.

Data concerning the subterranean formation is collected using a variety of sources. Such formation data may be static or dynamic. Static data relates to, for instance, formation structure and geological stratigraphy that define geological structures of the subterranean formation. Dynamic data relates to, for instance, fluids flowing through the geologic structures of the subterranean formation over time. Such static and/or dynamic data may be collected to learn more about the formations and the valuable assets contained therein.

Various equipment may be positioned about the field to monitor field parameters, to manipulate the operations and/or to separate and direct fluids from the wells. Surface equipment and completion equipment may also be used to inject fluids into reservoirs, either for storage or at strategic points to enhance production of the reservoir.

SUMMARY

In one or more implementations of steering a drilling operation of a well using rock stress measurements, the method includes obtaining well data from at least one logging while drilling tool in the well, where the well data includes stress direction information, generating, using a central processing unit (CPU), a well trajectory using survey data from the well, where the well trajectory includes a borehole direction, determining, using the CPU, a direction of minimum horizontal stress using the well data, and comparing, using the CPU, the direction of minimum horizontal stress to the borehole direction to determine that a directional criteria is not satisfied. The method further includes in response to determining that the directional criteria is not satisfied, generating an updated well trajectory that satisfies the directional criteria and adjusting the drilling operation using the updated well trajectory.

Other aspects of wellbore steering based on rock stress direction will be apparent from the following description and the appended claims.

BRIEF DESCRIPTION OF THE DRAWINGS

The appended drawings illustrate several embodiments of wellbore steering based on rock stress direction and are not to be considered limiting of its scope, for wellbore steering based on rock stress direction may admit to other equally effective embodiments.

DETAILED DESCRIPTION

Figure 1:
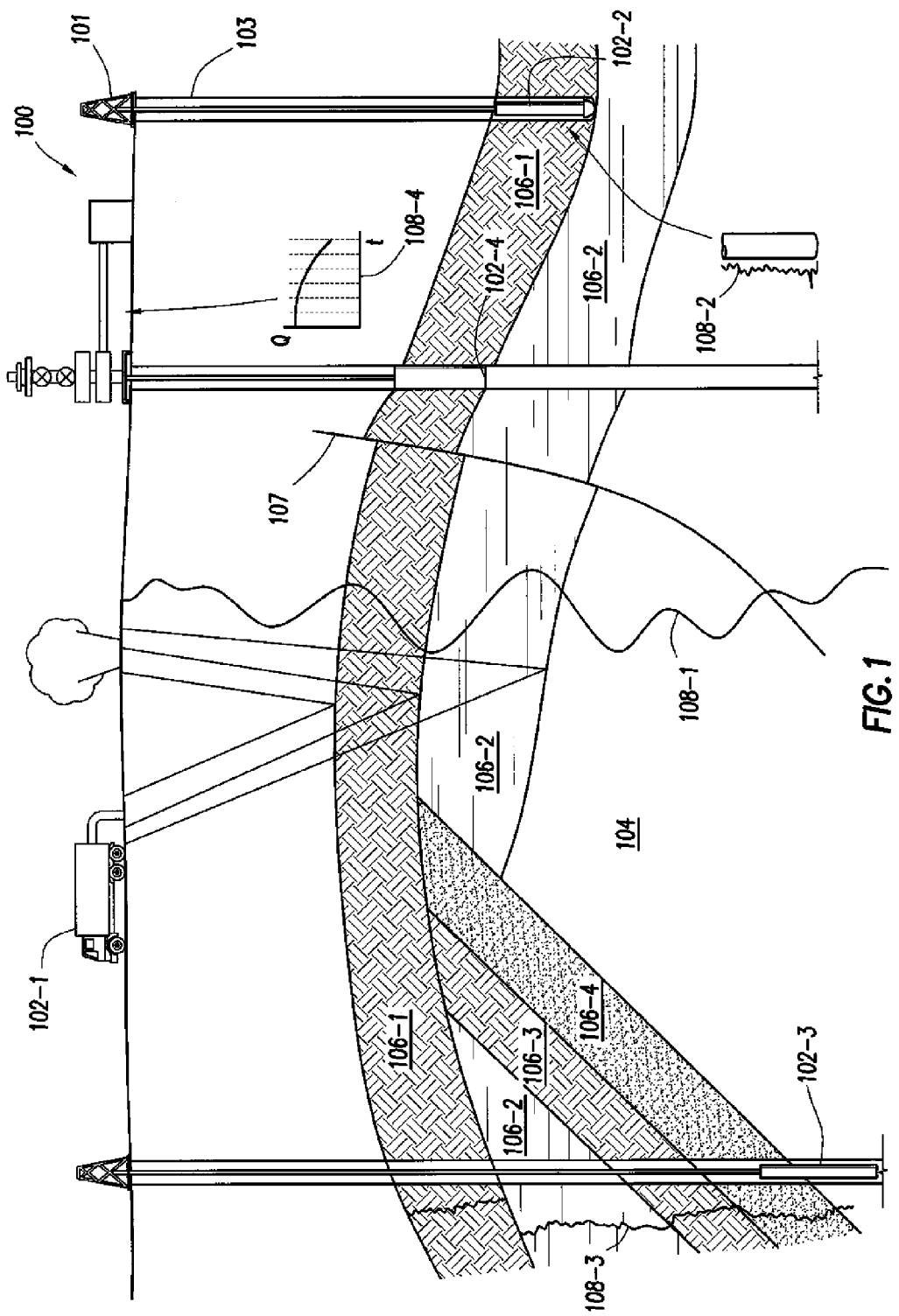
FIG. 1 depicts a schematic view, partially in cross-section, of a field having a plurality of data acquisition tools positioned at various locations along the field for collecting data from the subterranean formation, in which embodiments of wellbore steering based on rock stress direction may be implemented.

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

FIG. 1 depicts a schematic view, partially in cross section of a field (100) having data acquisition tools (102-1), (102-2), (102-3), and (102-4) positioned at various locations in the field for gathering data of a subterranean formation (104). As shown, the data collected from the tools (102-1 through 102-4) can be used to generate data plots (108-1 through 108-4), respectively.

As shown in FIG. 1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

As shown in FIG. 1, a drilling operation is depicted as being performed by drilling tools (102-2) suspended by a rig (101) and advanced into the subterranean formations (104) to form a wellbore (103). The drilling tools (106b) may be adapted for measuring downhole properties using logging-while-drilling ("LWD") tools.

A surface unit (now shown) is used to communicate with the drilling tools (102-2) and/or offsite operations. The surface unit is capable of communicating with the drilling tools (102-2) to send commands to the drilling tools (102-2), and to receive data therefrom. The surface unit may be provided with computer facilities for receiving, storing, processing, and/or analyzing data from the oilfield. The surface unit collects data generated during the drilling operation and produces data output which may be stored or transmitted. Computer facilities, such as those of the surface unit, may be positioned at various locations about the oilfield and/or at remote locations.

Sensors, such as gauges, may be positioned about the oilfield to collect data relating to various oilfield operations as described previously. For example, the sensor may be positioned in one or more locations in the drilling tools (102-2) and/or at the rig (101) to measure drilling parameters, such as weight on bit, torque on bit, pressures, temperatures, flow rates, compositions, rotary speed and/or other parameters of the oilfield operation.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/or reservoir engineering. In this example, the reservoir, wellbore, surface and/or process data may be used to perform reservoir, wellbore, geological, geophysical, or other simulations. The data outputs from the oilfield operation may be generated directly from the sensors, or after some preprocessing or modeling. These data outputs may act as inputs for further analysis.

As shown in FIG. 1, data plots (108-1 through 108-4) are examples of plots of static properties that may be generated by the data acquisition tools (102-1 through 102-4), respectively. For example, data plot (108-1) is a seismic two-way response time. In another example, data plot (108-2) is core sample data measured from a core sample of the formation (104). In another example, data plot (108-3) is a logging trace. In another example, data plot (108-4) is a plot of a dynamic property, the fluid flow rate over time. Those skilled in the art will appreciate that other data may also be collected, such as, but not limited to, historical data, user inputs, economic information, other measurement data, and other parameters of interest.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this documents based on the context.

The data collected from various sources, such as the data acquisition tools of FIG. 1, may then be evaluated. Typically, seismic data displayed in the data plot (108-1) from the data acquisition tool (102-1) is used by a geophysicist to determine characteristics of the subterranean formation (104). Core data shown in plot (108-2) and/or log data from the well log (108-3) is typically used by a geologist to determine various characteristics of the geological structures of the subterranean formation (104). Production data from the production graph (108-4) is typically used by the reservoir engineer to determine fluid flow reservoir characteristics.

Figure 2:
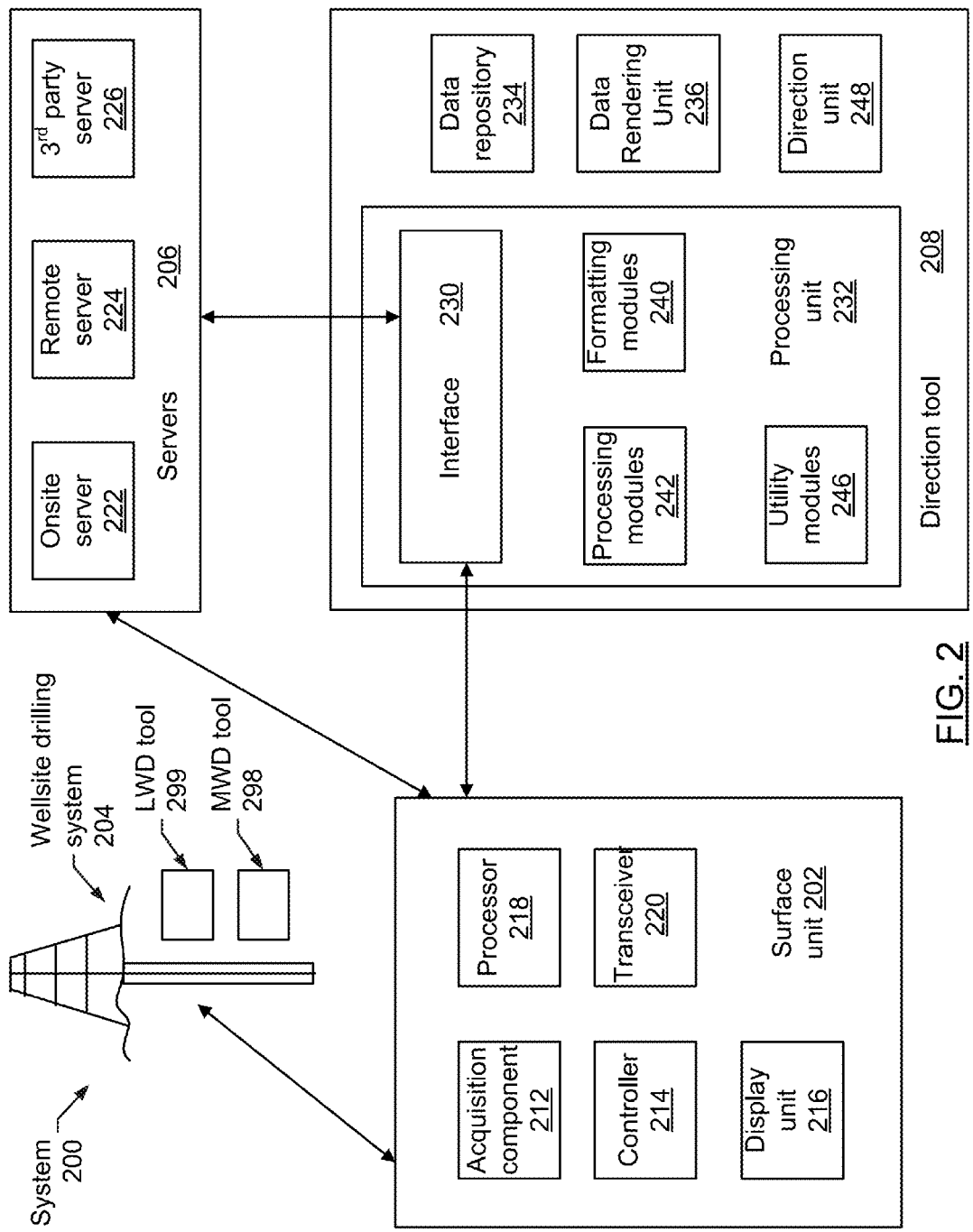
FIG. 2 depicts a system in which one or more embodiments of wellbore steering based on rock stress direction may be implemented.

FIG. 2 depicts a system (200) incorporated with a portion of a field, as shown and described above with respect to FIG. 1. As shown, the system (200) includes a surface unit (202) operatively connected to a wellsite drilling system (204), servers (206), and a direction tool (208) via an interface (230) on the direction tool (208). The direction tool (208) is also operatively linked, via the interface (230), to the servers (206). The surface unit (202) and wellsite drilling system (204) may include various field tools and wellsite facilities. As shown, communication links are provided between the surface unit (202) and the wellsite drilling system (204), servers (206), and direction tool (208). A communication link is also provided between the direction tool (208) and the servers (206). A variety of links may be provided to facilitate the flow of data through the system (200). For example, the communication links may provide for continuous, intermittent, one-way, two-way and/or selective communication throughout the system (200). The communication links may be of any type, including but not limited to wired and wireless.

In one or more embodiments, the wellsite drilling system (204) is configured to perform oilfield operations as described above with respect to FIG. 1. Specifically, the wellsite drilling system (204) may be configured to perform drilling operations as directed by a surface unit (202). In one or more embodiments, the surface unit (202) is provided with an acquisition component (212), a controller (214), a display unit (216), a processor (218), and a transceiver (220). The acquisition component (212) collects and/or stores data of the field. This data may be measured by sensors at the wellsite. This data may also be received from other sources, such as those described with respect to FIG. 1 above.

The controller (214) may be enabled to enact commands at the field. The controller (214) may be provided with actuation means that can perform drilling operations, such as steering, advancing, or otherwise taking action at the wellsite. Commands may be generated based on logic of the processor (218), or by commands received from other sources. In one or more embodiments, the processor (218) is provided with features for manipulating and analyzing the data. The processor (218) may be provided with additional functionality to perform field operations.

In one or more embodiments, a display unit (216) may be provided at the wellsite and/or remote locations for viewing field data (not shown). The field data represented by the display unit (216) may be raw data, processed data and/or data outputs generated from various data. In one or more embodiments, the display unit (216) is adapted to provide flexible views of the data, so that the screens depicted may be customized as desired. A user may plan, adjust, and/or otherwise perform field operations (e.g., determine the desired course of action during field operations) based on reviewing the displayed field data. The field operations may be selectively adjusted in response to viewing the data on the display unit (216). The display unit (216) may include a two-dimensional (2D) display or a three-dimensional (2D) display for viewing field data or various aspects of the field operations.

In one or more embodiments, the transceiver (220) provides a means for providing data access to and/or from other sources. The transceiver (220) may also provide a means for communicating with other components, such as the servers (206), the wellsite drilling system (204), the surface unit (202), and/or the direction tool (208).

The servers (206) may be configured to transfer data from a surface unit (202) at one or more wellsites to the direction tool (208). As shown, the servers (206) include an onsite server (222), a remote server (224), and a third party server (226). The onsite server (222) may be positioned at the wellsite and/or other locations for distributing data from the surface unit (202). As shown, the remote server (224) is positioned at a location away from the field and provides data from remote sources. The third party server (226) may be onsite or remote, but is often operated by a third party, such as a client.

In one or more embodiments, the servers (206) are capable of transferring data, such as logs, drilling events, trajectory, seismic data, historical data, economics data, other field data, and/or other data that may be of use during analysis. The type of server is not intended to limit wellbore steering based on rock stress direction. In one or more embodiments, the system is adapted to function with any type of server that may be employed.

In one or more embodiments, the servers (206) communicate with the direction tool (208) through the communication links. As indicated by the multiple arrows, the servers (206) may have separate communication links with the direction tool (208) and the surface unit (202). One or more of the servers (206) may be combined or linked to provide a combined communication link.

In one or more embodiments, the servers (206) collect a wide variety of data. The data may be collected from a variety of channels that provide a certain type of data, such as well logs. The data from the servers is passed to the direction tool (208) for processing. The servers (206) may also be configured to store and/or transfer data. For example, the data may be collected at the wellsite drilling system (204) using measurements-while-drilling (MWD) tools, logging-while-drilling (LWD) tools, any other similar types of drilling measurement tools, or any combination thereof. More specifically, the MWD tools and/or LWD tools may be configured to obtain information related to borehole azimuth and azimuth of minimum horizontal stress during a drilling operation of the borehole at the wellsite drilling system (204). For example, a MWD tool may be configured to obtain magnetometer data and/or accelerometer data for determining the borehole azimuth. In another example, a LWD tool may be configured to obtain electrical images of the borehole for identifying drilling induced fractures. Drilling induced factures have been shown to be directly related to the azimuth of minimum horizontal stress. In another example, a LWD tool may be configured to obtain directional sonic measurements, which have been shown to be related to the azimuth of minimum horizontal stress.

Those skilled in the art will appreciate that MWD tools are configured to evaluate physical properties during the drilling of a wellbore. A MWD tool may obtain measurements downhole, which may be stored and then transmitted to the surface. In this case, the measurements may be transmitting to the surface as pressure pulses in the mud system (e.g., positive, negative, or continuous sine waves). One skilled in the art will appreciate that MWD tools that measure formation parameters (resistivity, porosity, sonic velocity, gamma ray) are referred to as LWD tools. LWD tools may obtain, store, and transmit measurements as discussed above with respect to MWD tools.

In one or more embodiments, the direction tool (208) is operatively linked to the surface unit (202) for receiving data therefrom. In some cases, the direction tool (208) and/or server(s) (206) may be positioned at the wellsite. The direction tool (208) and/or server(s) (206) may also be positioned at various locations. The direction tool (208) may be operatively linked to the surface unit (202) via the server(s) (206). The direction tool (208) may also be included in or located near the surface unit (202).

In one or more embodiments, the direction tool (208) includes an interface (230), a processing unit (232), a data repository (234), and a data rendering unit (236). In one or more embodiments, the direction unit (248) of the direction tool (208) is configured to monitor downhole properties for borehole steering. More specifically, the direction unit (248) may be configured to use downhole properties obtained by MWD tools (e.g., MWD tool (298)) and/or LWD tools (e.g., LWD tool (299)) at the wellsite drilling system (204) to determine an optimal direction for a drilling operation. In this case, the downhole properties may be obtained from the servers (206), where the wellsite drilling system (204) and surface unit (202) are configured to store the downhole properties in the servers (206) in real time.

In one or more embodiments, the direction unit (248) is configured to determine the borehole azimuth and the azimuth of minimum horizontal stress. In this case, the direction unit (248) may determine the borehole azimuth and the azimuth of minimum horizontal stress using well data (e.g., survey data, an electrical image of the borehole, directional sonic measurements) obtained from a LWD tool and/or MWD tool. For example, the borehole azimuth may be determined based on survey data (e.g., magnetometer data, accelerometer data, etc.) from a LWD tool. In another example, the azimuth of minimum horizontal stress may be determined based on an electrical image of the borehole and/or directional sonic measurements from a MWD tool.

In one or more embodiments, the direction unit (248) may be configured to compare the borehole azimuth and the azimuth of minimum horizontal stress based on directional criteria. More specifically, the direction unit (248) is configured to generate an optimal well trajectory based on the comparison of the borehole azimuth and the azimuth of minimum horizontal stress. In this case, the directional criteria may specify that the borehole azimuth should be steered relative to the azimuth of minimum horizontal stress. For example, in an un-conventional (i.e., shale) gas reservoir, the directional criteria may specify that the difference between the borehole azimuth and the azimuth of minimum horizontal stress should be minimized (i.e., maintained below a specified threshold) in order to optimize the productivity of hydraulic fractures in a horizontal well. In another example, the directional criteria may be for optimizing the stability of the well. The optimal well trajectory determined by the direction unit (248) may then be used at the surface unit (202) to adjust a drilling operation. In other words, the direction unit (248) may be configured to provide real time feedback, including an optimal well trajectory generated based on an analysis of the azimuth information, to the surface unit (202), where a drilling operation may be adjusted at the surface unit (202) accordingly.

Those skilled in the art will appreciate that the directional criteria may be adjusted in real time based on the current conditions of a drilling operation. More specifically, the directional criteria may be adjusted according to the current geological structure being drilled by the wellbore. For example, the directional criteria may be adjusted to optimize the productivity of hydraulic fractures while drilling in shale. In another example, the directional criteria may be adjusted to optimize wellbore stability while drilling near a salt dome.

Optionally, the direction unit (248) may be configured to continually update an earth model (e.g., a full field numerical model, a geostatistical model, etc.) based on the determined borehole azimuth and the azimuth of minimum horizontal stress. In this case, the direction unit (248) may be configured to generate the optimal well trajectory using the updated earth model. Further, the earth model may initially be generated based on subsurface measurements as described above with respect to FIG. 1.

In one or more embodiments, the interface (230) of the direction tool (208) is configured to communicate with the servers (206) and the surface unit (202). The interface (230) may also be configured to communicate with other oilfield or non-oilfield sources. The interface (230) may be configured to receive the data and map the data for processing. In one or more embodiments, data from the servers (206) is sent along predefined channels, which may be selected by the interface (230).

As depicted in FIG. 2, the interface (230) selects the data channel of the server(s) (206) and receives the data. In one or more embodiments, the interface (230) also maps the data channels to data from the wellsite. The data may then be passed from the interface (230) to the processing modules (242) of the processing unit (232). In one or more embodiments, the data is immediately incorporated into the direction tool (208) for real time sessions and/or modeling. The interface (230) may create data requests (e.g., surveys, logs, MWD/LWD data, etc.), display the user interface, and monitor connection state events. In one or more embodiments, the interface (230) also instantiates the data into a data object for processing.

In one or more embodiments, the processing unit (232) includes formatting modules (240), processing modules (242), and utility modules (246). These modules are configured to manipulate the field data for analysis, potentially in real time.

In one or more embodiments, the formatting modules (240) transform the data to a desired format for processing. Incoming data may be formatted, translated, converted, or otherwise manipulated for use. In one or more embodiments, the formatting modules (240) are configured to enable the data from a variety of sources to be formatted and used so that the data processes and displays in real time.

In one or more embodiments, the utility modules (246) provide support functions to the direction tool (208). In one or more embodiments, the utility modules (246) include a logging component (not shown) and a user interface (UI) manager component (not shown). The logging component provides a common call for the logging data, which means that the utility modules (246) allow the logging destination to be set by the application. The logging component may also be provided with other features, such as a debugger, a messenger, and a warning system, among others. The debugger sends a debug message to those using the system. The messenger sends information to subsystems, users, and others. The information sent by the messenger may or may not interrupt the operation and may be distributed to various locations and/or users throughout the system. The warning system may be configured to send error messages and warnings to various locations and/or users throughout the system. In some cases, the warning messages may interrupt the process and display alerts.

In one or more embodiments, the UI manager component (not shown) creates user interface elements for displays. The UI manager component defines user input screens, such as menu items, context menus, toolbars, and settings windows. The UI manager may also be configured to direct events relating to these user input screens.

In one or more embodiments, the processing modules (242) are configured to analyze the data and generate outputs. As described above, the data analyzed by the processing modules (242) may include static data, dynamic data, historic data, real time data, or other types of data. Further, the data analyzed by the processing modules (242) may relate to various aspects of the field operations, such as formation structure, geological stratigraphy, core sampling, well logging, density, resistivity, fluid composition, flow rate, downhole condition, surface condition, equipment condition, or other aspects of the field operations. In one or more embodiments, the data is processed by the processing module (242) into multiple volume data sets for storage and retrieval.

In one or more embodiments, the data repository (234) stores the data for the direction tool (208). The data stored in the data repository (234) may be in a format available for use in real time (e.g., information is updated at approximately the same rate that the information is received). In one or more embodiments, the data is passed to the data repository (234) from the processing modules (242). The data can be persisted in the file system (e.g., as an extensible markup language (XML) file) or in a database. The user, a computer program, or some other determining entity may determine which storage is the most appropriate to use for a given piece of data and stores the data in a manner to enable automatic flow of the data through the rest of the system in a seamless and integrated fashion. The system may also facilitate manual and automated workflows (e.g., Modeling, Geological, and Geophysical workflows) based upon the persisted data.

In one or more embodiments, the data rendering unit (236) performs rendering algorithm calculations to provide one or more displays for visualizing the data. The displays for visualizing the data may be presented, using one or more communication links, to a user at the display unit (216) of the surface unit (202). The data rendering unit (236) may contain a 2D canvas, a 3D canvas, a well section canvas, or other canvases, either by default or as selected by a user. The data rendering unit (236) may selectively provide displays composed of any combination of one or more canvases. The canvases may or may not be synchronized with each other during display. In one or more embodiments, the data rendering unit (236) is provided with mechanisms for actuating various canvases or other functions in the system. Further, the data rendering unit (236) may selectively provide displays composed of any combination of one or more volume data sets. The volume data sets typically contain exploration and production data.

While specific components are depicted and/or described for use in the units and/or modules of the direction tool (208), it will be appreciated that a variety of components with various functions may be configured to provide the formatting, processing, utility, and coordination functions necessary to process data in the direction tool (208). The components may have combined functionalities and may be implemented as software, hardware, firmware, or suitable combinations thereof.

Further, components (e.g., the processing modules (242), the data rendering unit (236), etc.) of the direction tool (208) may be located in an onsite server (222) or in distributed locations where a remote server (224) and/or a third party server (226) may be involved. The onsite server (222) may be located within the surface unit (202).

Figure 3:
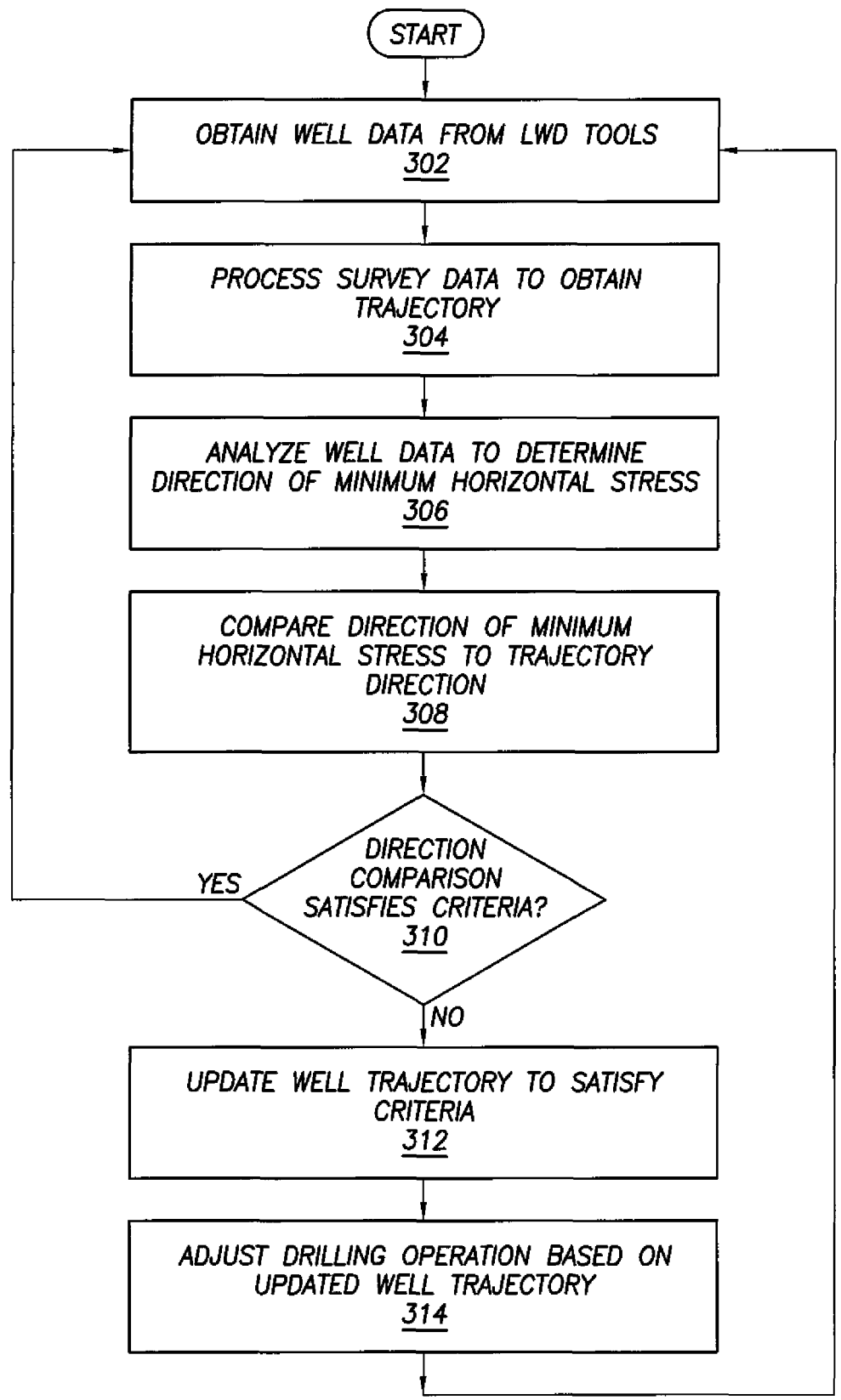
FIG. 3 depicts an example method for wellbore steering based on rock stress direction in accordance with one or more embodiments.

FIG. 3 depicts a flowchart of a method in accordance with one or more embodiments. One or more of the blocks shown in FIG. 3 may be omitted, repeated, and/or performed in a different order. Accordingly, embodiments should not be considered limited to the specific arrangements of blocks shown in FIG. 3.

In one or more embodiments, the method depicted in FIG. 3 may be practiced during a drilling operation as described above with respect to FIGS. 1-2. In block 302, well data is obtained from logging-while-drilling (LWD) tools. The well data may include, but is not limited to, an electrical image of the borehole, directional sonic data, or some suitable combination thereof. In one or more embodiments, a computer, as described with respect to FIG. 4 below, is used to obtain the well data.

In block 304, survey data is processed to obtain a well trajectory. The survey data may be obtained using monitoring-while-drilling (MWD) tools. The survey data may include information (e.g., magnetometer data, accelerometer data, etc.) related to the borehole direction (i.e., borehole azimuth). In one or more embodiments, a computer, as described with respect to FIG. 4 below, is used to process the survey data.

In block 306, the well data is analyzed to determine the direction (i.e., azimuth) of minimum horizontal stress. For example, if the well data includes an electrical image of the borehole, the electrical image may be analyzed to identify drilling induced fractures. Drilling induced factures have been shown to be directly related to the direction of minimum horizontal stress. In another example, the well data may include directional sonic measurements, which have also been shown to be related to the direction of minimum horizontal stress. In one or more embodiments, a computer, as described with respect to FIG. 4 below, is used to analyze the well data.

In block 308, the direction of minimum horizontal stress is compared to the borehole direction. More specifically, the direction of minimum horizontal stress is compared to the borehole direction in real time (i.e., the comparison is performed during the drilling operation associated with the well data and the survey data) to determine a difference in the directions. The real time nature of the comparison allows decisions to be made as the drilling operation is performed. In one or more embodiments, a computer, as described with respect to FIG. 4 below, is used to compare the direction information.

In block 310, a determination is made as to whether the direction comparison satisfies a directional criteria. The directional criteria may specify a variety of directional requirements such as, but not limited to, minimizing the difference between the borehole direction and the direction of minimum horizontal stress, ensuring the borehole direction is perpendicular to the direction of minimum horizontal stress, etc. The directional criteria may be specified based on the composition of the formation and/or the current objectives of the drilling operation. For example, in a shale reservoir, the directional criteria may specify that the difference between the borehole direction and the direction of minimum horizontal stress should be minimized (i.e., maintained below a specified threshold) in order to improve the productivity of hydraulic fractures. In another example, the directional criteria may specify that the borehole direction should be perpendicular to the direction of minimum horizontal stress in order to increase stability of the borehole. If it is determined that the directional criteria is satisfied, the method may return to block 302. In one or more embodiments, a computer, as described with respect to FIG. 4 below, is used to determine whether the direction comparison satisfies the directional criteria.

In response to determining that the directional criteria is not satisfied, the well trajectory is updated to satisfy the directional criteria (block 312). More specifically, the well trajectory is updated to steer the borehole direction relative to the direction of minimum horizontal stress, as specified in the directional criteria. For example, the comparison of the directional information in view of the directional criteria is used to steer the drilling of the borehole in real time (e.g., steering the drilling of the borehole to minimize the difference in direction between the borehole direction and the direction of minimum horizontal stress). In another example, an earth model of the drilling operation including a proposed well trajectory may be updated to satisfy the directional criteria, where the updated earth model may then be used to steer the drilling of the borehole in real time. In one or more embodiments, a computer, as described with respect to FIG. 4 below, is used to update the well trajectory to satisfy the directional criteria.

In block 314, the drilling operation is adjusted based on the updated well trajectory. The drilling operation may be adjusted using a surface unit as described above with respect to FIGS. 1 and 2. In one or more embodiments, a computer, as described with respect to FIG. 4 below, is used to adjust the drilling operation.

Those skilled in the art will appreciate that blocks 302-314 may be repeated any number of times during a drilling operation. In this case, the drilling operation may be continually adjusted in real time based on the directional criteria. Further, during the iterations of block 302-314, the directional criteria may be updated based on the current objectives (e.g., productivity, stability, etc.) of the drilling operation.

Figure 4:
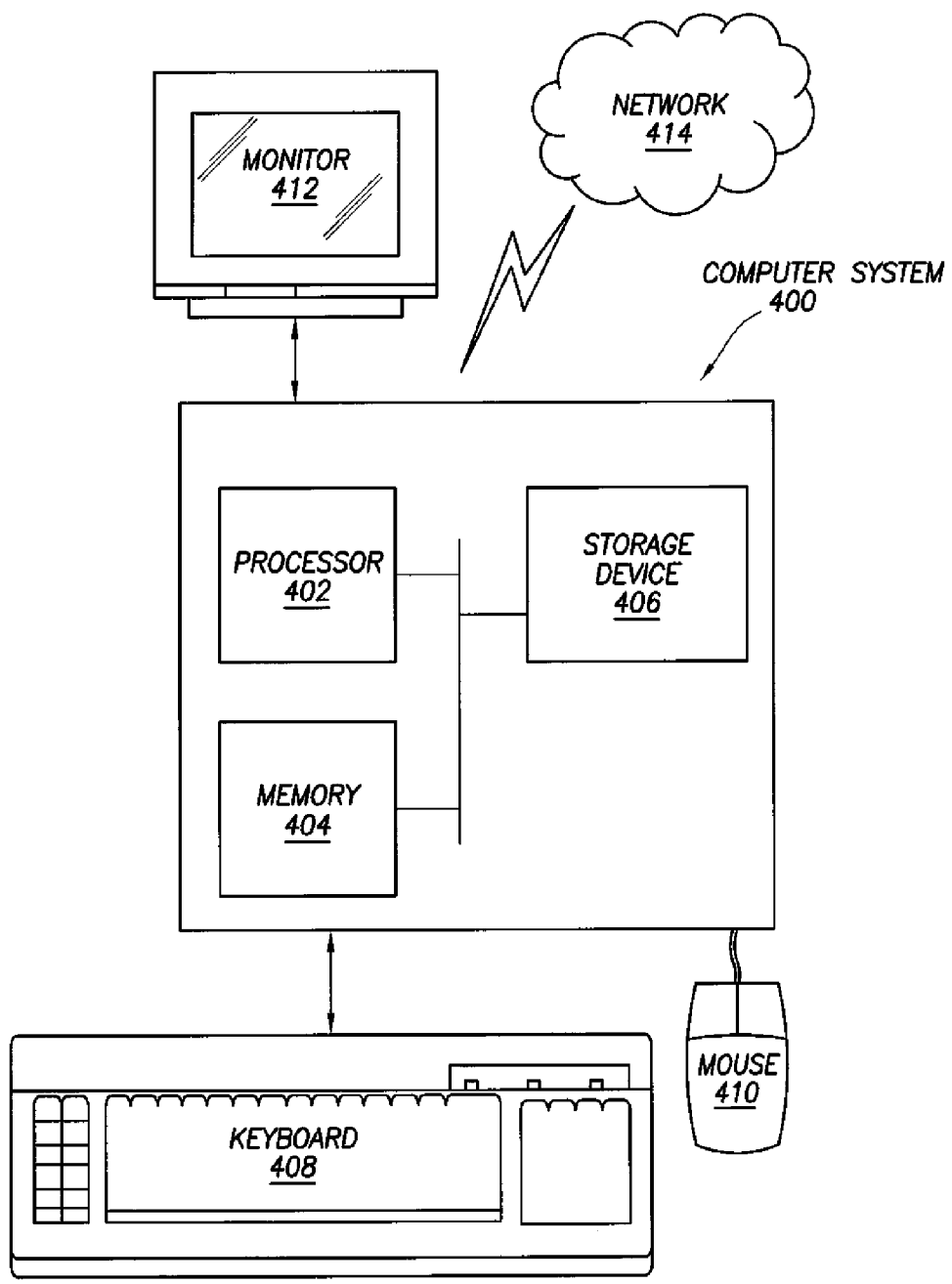
FIG. 4 depicts a computer system in which one or more embodiments of wellbore steering based on rock stress direction may be implemented.

Embodiments of wellbore steering based on rock stress direction may be implemented on virtually any type of computer regardless of the platform being used. For instance, as shown in FIG. 4, a computer system (400) includes one or more processor(s) (402) such as a central processing unit (CPU) or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display LCD, a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (400) includes at least the minimal processing, input, and/or output means necessary to practice one or more embodiments.

Further, those skilled in the art will appreciate that one or more elements of the aforementioned computer system (400) may be located at a remote location and connected to the other elements over a network. Further, one or more embodiments may be implemented on a distributed system having a plurality of nodes, where each portion of the implementation (e.g., the direction tool, the servers) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground fluids or other geomaterials materials from other fields. Further, portions of the systems and methods may be implemented as software, hardware, firmware, or combinations thereof.

While wellbore steering based on rock stress direction has been described with respect to a limited number of embodiments, those skilled in the art, having benefit of this disclosure, will appreciate that other embodiments may be devised which do not depart from the scope of wellbore steering based on rock stress direction as disclosed herein. Accordingly, the scope of wellbore steering based on rock stress direction should be limited only by the attached claims.

What is claimed is:

1. A method of steering a drilling operation of a well using rock stress measurements, comprising:
obtaining, during the drilling operation, well data from at least one logging while drilling tool in the well, wherein the well data comprises stress direction information;
generating, using a central processing unit (CPU) and during the drilling operation, a well trajectory using survey data of the well obtained during the drilling operation from at least one monitoring while drilling tool in the well, wherein the well trajectory comprises a borehole azimuth;
determining, using the CPU and during the drilling operation, an azimuth of minimum horizontal stress using the well data;
comparing, using the CPU and during the drilling operation, the azimuth of minimum horizontal stress to the borehole azimuth to determine that an initial directional criteria is not satisfied, wherein the initial directional criteria specifies, based on a first current objective of the drilling operation, a first relation between the borehole azimuth and the azimuth of minimum horizontal stress;
in response to determining that the initial directional criteria is not satisfied, generating an updated well trajectory that satisfies the initial directional criteria during the drilling operation;
adjusting the drilling operation using the updated well trajectory;
updating, while drilling the well, the initial directional criteria to an updated directional criteria based on a second current objective of the drilling operation, wherein the updated directional criteria specifies, based on the second current objective of the drilling operation, a second relation between the borehole azimuth and the azimuth of minimum horizontal stress; and
continuing drilling the well in accordance with the updated directional criteria.

2. The method of claim 1, wherein continuing drilling the well in accordance with the updated directional criteria comprises:
comparing, using the CPU, the azimuth of minimum horizontal stress to the borehole azimuth to determine that the updated directional criteria is not satisfied; and
in response to determining that the updated directional criteria is not satisfied, adjusting the updated well trajectory and the drilling operation to satisfy the updated directional criteria.

3. The method of claim 1, wherein the drilling operation is continuously adjusted in real-time based on the well data from the at least one logging while drilling tool.

4. The method of claim 1, wherein the well data comprises at least one selected from a group consisting of an electrical image of a borehole and directional sonic data of the well.

5. The method of claim 1, wherein the updated well trajectory is generated using an earth model.

6. The method of claim 5, further comprising:
generating the earth model using a plurality of subsurface measurements; and
updating the earth model using the borehole azimuth and the azimuth of minimum horizontal stress.

7. A system for steering a drilling operation of a well using rock stress measurements, comprising:
at least one logging while drilling tool configured to obtain, during the drilling operation, well data comprising stress direction information;
at least one monitoring while drilling tool configured to obtain, during the drilling operation, survey data from the well;
at least one server operatively connected to the at least one logging while drilling tool and the at least one monitoring while drilling tool for storing the stress direction information and the survey data;
a direction tool operatively connected to the at least one server and configured to:
generate, during the drilling operation, a well trajectory using survey data from the well, wherein the well trajectory comprises a borehole azimuth;
determine, during the drilling operation, an azimuth of minimum horizontal stress using the well data;
compare, during the drilling operation, the azimuth of minimum horizontal stress to the borehole azimuth to determine that an initial directional criteria is not satisfied, wherein the initial directional criteria specifies, based on a first current objective of the drilling operation, a first relation between the borehole azimuth and the azimuth of minimum horizontal stress;
in response to determining that the initial directional criteria is not satisfied, generate an updated well trajectory that satisfies the initial directional criteria during the drilling operation; and
update, while drilling the well, the initial directional criteria to an updated directional criteria based on a second current objective of the drilling operation, wherein the updated directional criteria specifies, based on the second current objective of the drilling operation, a second relation between the borehole azimuth and the azimuth of minimum horizontal stress; and
a controller configured to:
adjust, prior to the updating the initial directional criteria, the drilling operation using the updated well trajectory; and
continue to drill the well in accordance with the updated drilling criteria.

8. The system of claim 7, wherein the direction tool is further configured to:
compare, using the CPU, the azimuth of minimum horizontal stress to the borehole direction to determine that the updated directional criteria is not satisfied;
in response to determining that the updated directional criteria is not satisfied, adjust the updated well trajectory to satisfy the updated directional criteria to obtain an adjusted well trajectory; and
provide the adjusted well trajectory to the controller for the controller to continue to drill the well in accordance with the updated drilling criteria.

9. The system of claim 7, wherein the controller is configured to continuously adjust the drilling operation in real-time based on the well data from the at least one logging while drilling tool.

10. The system of claim 7, wherein the well data comprises at least one selected from a group consisting of an electrical image of a borehole and directional sonic data of the well.

11. The system of claim 7, wherein the direction tool generates the updated well trajectory using an earth model.

12. The system of claim 11, wherein the direction tool is further configured to:
   generate the earth model using a plurality of subsurface measurements; and
   update the earth model using the borehole azimuth and the azimuth of minimum horizontal stress.

13. A computer readable medium storing instructions for steering a drilling operation of a well using rock stress measurements, the instructions when executed causing a processor to:
   obtain, during the drilling operation, well data from at least one logging while drilling tool in the well, wherein the well data comprises stress direction information;
   generate, during the drilling operation, a well trajectory using survey data of the well obtained during the drilling operation from at least one monitoring while drilling tool in the well, wherein the well trajectory comprises a borehole azimuth;
   determine, during the drilling operation, a direction of minimum horizontal stress using the well data;
   compare, during the drilling operation, the azimuth of minimum horizontal stress to the borehole azimuth to determine that an initial directional criteria is not satisfied, wherein the initial directional criteria specifies, based on a first current objective of the drilling operation, a first relation between the borehole azimuth and the azimuth of minimum horizontal stress;
   in response to determining that the initial directional criteria is not satisfied, generate an updated well trajectory that satisfies the initial directional criteria during the drilling operation;
   adjust the drilling operation using the updated well trajectory;
   update, while drilling the well, the initial directional criteria to an updated directional criteria based on a second current objective of the drilling operation, wherein the updated directional criteria specifies, based on the second current objective of the drilling operation, a second relation between the borehole azimuth and the azimuth of minimum horizontal stress; and
   continue drilling the well in accordance with the updated directional criteria.

14. The computer readable medium of claim 13, wherein continuing drilling the well in accordance with the updated directional criteria comprises:
   compare, using the CPU, the azimuth of minimum horizontal stress to the borehole azimuth to determine that the updated directional criteria is not satisfied; and
   in response to determining that the updated directional criteria is not satisfied, adjust the updated well trajectory and the drilling operation to satisfy the updated directional criteria.

15. The computer readable medium of claim 13, wherein the drilling operation is continuously adjusted in real-time based on the well data from the at least one logging while drilling tool.

16. The computer readable medium of claim 13, wherein the well data comprises at least one selected from a group consisting of an electrical image of a borehole and directional sonic data of the well.

17. The computer readable medium of claim 13, wherein the updated well trajectory is generated using an earth model.

18. The computer readable medium of claim 17, wherein the instructions when executed further cause the processor to:
   generate the earth model using a plurality of subsurface measurements; and
   update the earth model using the borehole azimuth and the azimuth of minimum horizontal stress.

* * * * *